June 3, 1958 R. W. HENKE 2,837,105
PROPORTIONING FEEDER
Filed Sept. 30, 1955 6 Sheets-Sheet 1

INVENTOR.
RUSSELL W. HENKE
BY
John W. Michael
ATTORNEY

*INVENTOR.*
RUSSELL W. HENKE
BY
John W. Michael
ATTORNEY

June 3, 1958   R. W. HENKE   2,837,105
PROPORTIONING FEEDER
Filed Sept. 30, 1955   6 Sheets—Sheet 3
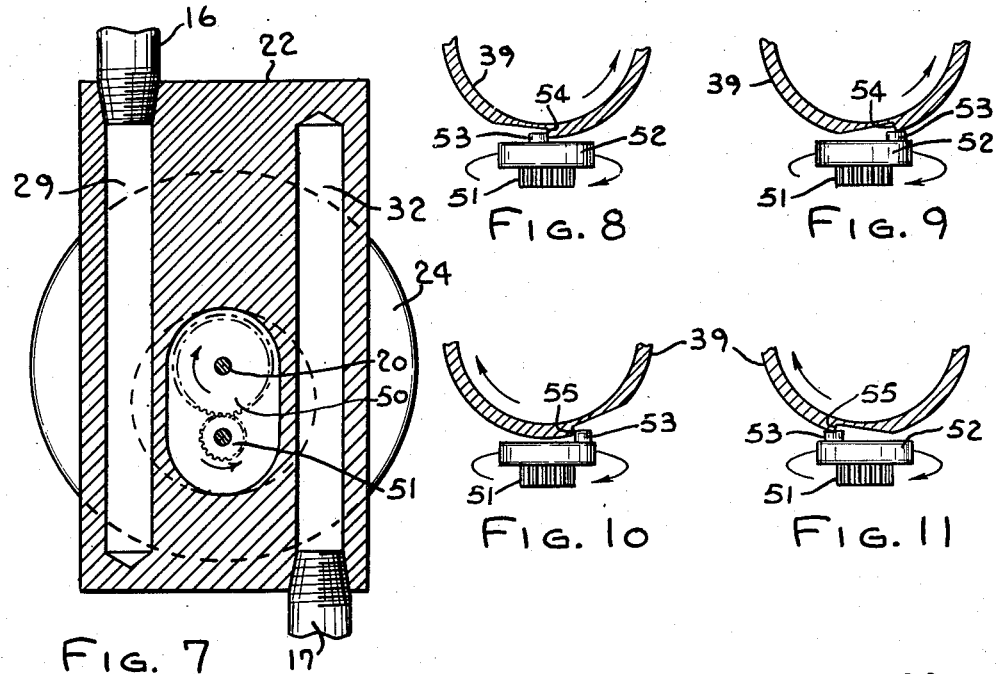
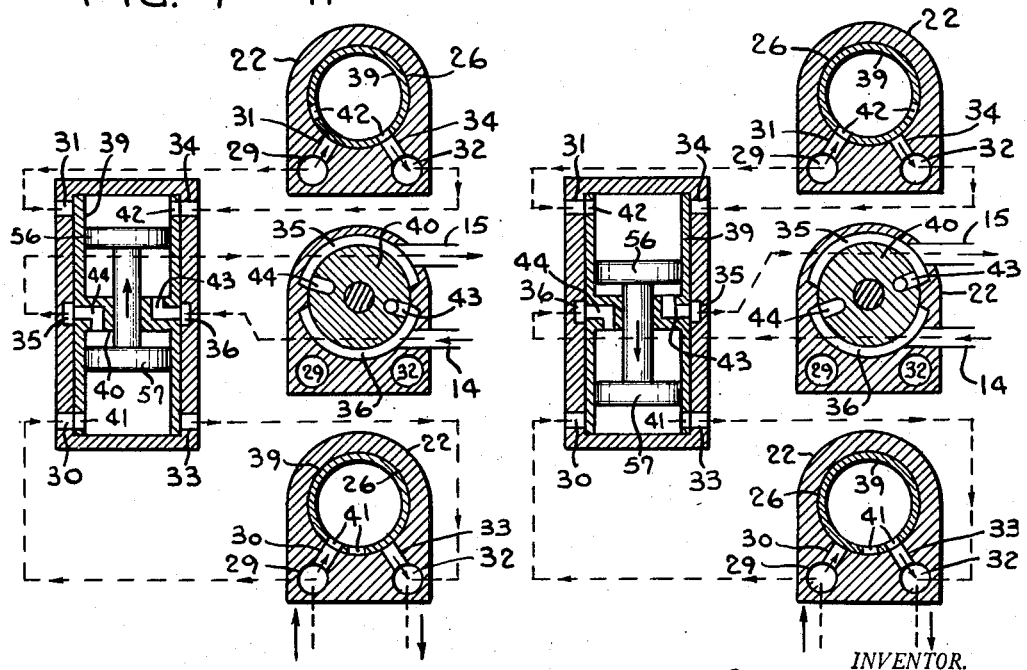
INVENTOR.
RUSSELL W. HENKE
BY
John W. Michael
ATTORNEY INVENTOR.
RUSSELL W. HENKE
BY
John W. Michael
ATTORNEY

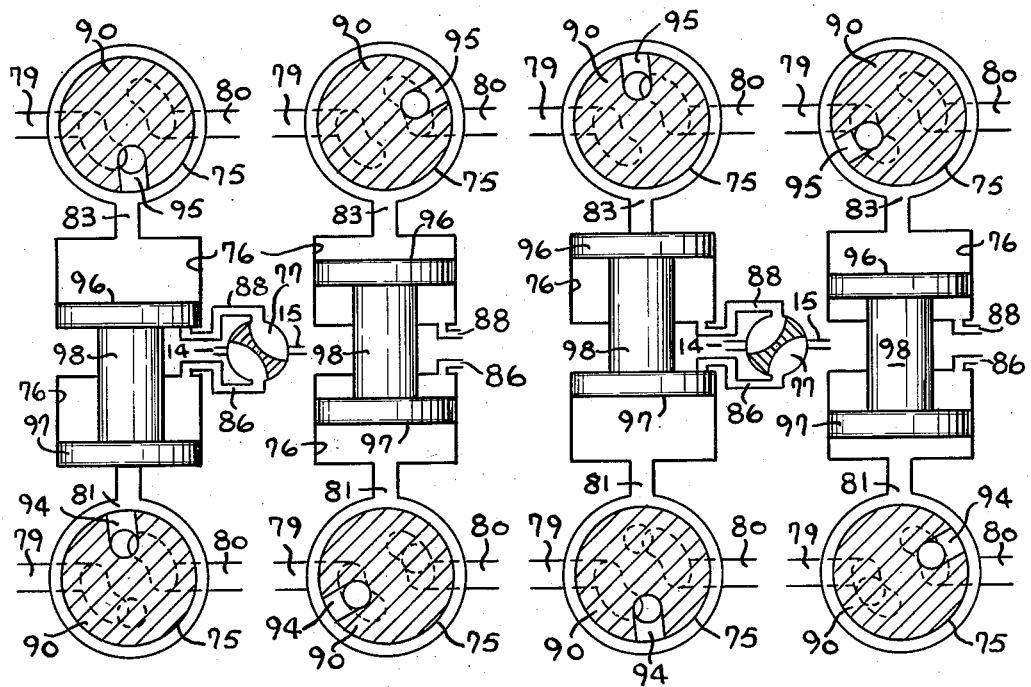
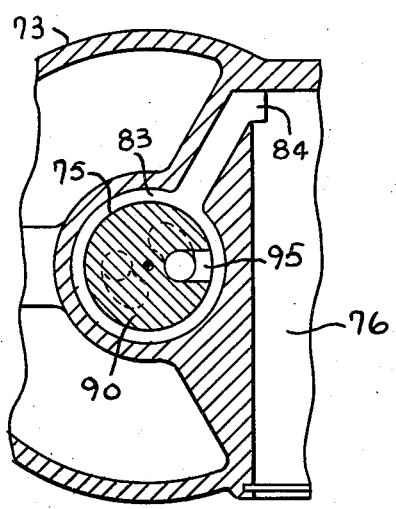
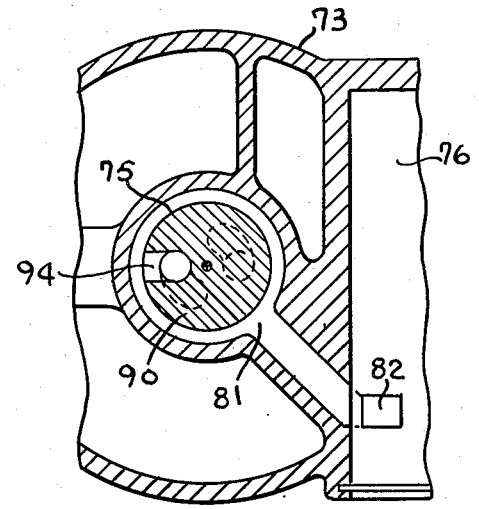

United States Patent Office 2,837,105
Patented June 3, 1958

2,837,105

PROPORTIONING FEEDER

Russell W. Henke, Milwaukee, Wis., assignor to Badger Meter Mfg. Company, Milwaukee, Wis., a corporation of Wisconsin Application September 30, 1955, Serial No. 537,741

10 Claims. (Cl. 137—99)

This invention relates to improvements in proportioning feeders particularly of the type controlled by a fluid flow responsive device.

One object of this invention is to provide a proportioning feeder of this type which may be readily installed on the casing of a fluid flow meter to continuously feed additive fluid to the primary fluid being metered in controlled proportions.

Another object of this invention is to provide a proportioning feeder which may be operated by a pressure drop through or externally of the meter or fluid responsive device which controls the proportioning feeder.

Another object of this invention is to provide a proportioning feeder of this type which is controlled by a fluid responsive device in the system into which the additive fluid is proportioned without using the power of such fluid motor to drive the proportioning feeder.

Another object of this invention is to provide a proportioning feeder of this type which provides positive displacement of the additive fluid and may develop pressure greater than that in the low pressure side of the system in which the controllling fluid flow responsive device is positioned.

These objects are obtained by placing in a single housing, fitting on the register seat of a flow rate meter, a pump utilizing a free floating piston having a large area for the power side and a small area for the additive fluid side and a movable control valve for such pump. The control valve is operated by the spindle of the flow rate meter. Such single housing may have a seat for a register which is also operated by such spindle. Simplification is also obtained by using the movable control valve as the cylinder for the pump. This requires less space and the unit may be made at lower cost.

Two embodiments of this invention are illustrated in the accompanying drawings, in which:

Fig. 7 is a sectional view taken on the line 7—7 of Fig. 4;

Fig. 8 is a fragmentary sectional view taken on the line 8—8 of Fig. 1 with the pump valve oscillating sleeve in neutral position and the operating pin in the right half of its circle of operation;

Fig. 9 is a view similar to Fig. 8 with the oscillating sleeve in position for charging the right end of the pump (as viewed in Fig. 1);

Fig. 10 is a fragmentary sectional view taken on the line 10—10 of Fig. 1 with the pump valve oscillating sleeve in the same position as shown in Fig. 9 and the operating pin in the left half of its circle of operation;

Fig. 11 is a view similar to Fig. 10 with the oscillating sleeve in position for charging the left end of the pump;

Fig. 12 is a diagrammatic view in section showing the relationship between the ports in the pump valve oscillating sleeve and the passages in the pump housing when such sleeve is in the position shown in Fig. 11 with the piston being driven toward the right as viewed in Fig. 1;

Fig. 13 is a view similar to Fig. 12 showing such relationship when such pump valve oscillating sleeve is in the position shown in Fig. 9 with the pump being driven toward the left as viewed in Fig. 1;

Fig. 19 is an enlarged fragmentary sectional view taken on the line 19—19 of Fig. 14;

Fig. 20 is an enlarged fragmentary section view taken on the line 20—20 of Fig. 14;

Fig. 21 is a diagrammatic view showing (a) the relationship between the ports in the pump valve and the passageways leading to the pump and (b) the relationship of the ports in the additive fluid control valve and the passageways leading to the pump, the source of additive fluid and the additive conduit when the pump pistons are at the front end of the pump as viewed in Fig. 14;

Fig. 22 is a view similar to Fig. 21 showing such relationships as the pistons are moving toward the rear end of such pump;

Fig. 23 is a view similar to Fig. 21 showing such relationships when the pistons have reached the rear end; and Fig. 24 is a view similar to Fig. 21 showing such relationships as the pistons are moving toward the front end of such pump.

Figure 1:
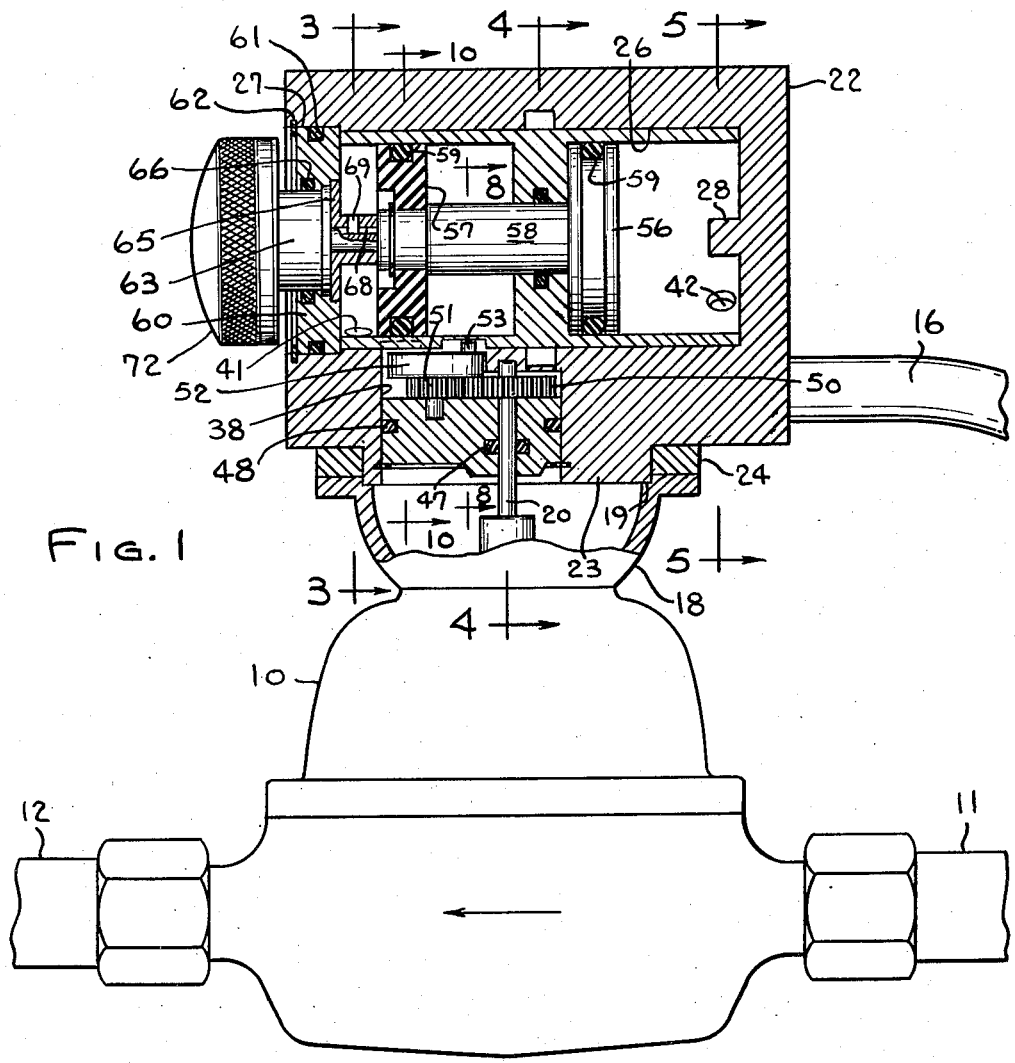
Fig. 1 is a view partly in side elevation and partly in section illustrating a proportioning feeder embodying the present invention.

Both modifications of the proportioning feeder shown in the drawings are used for substantially the same purpose. Each is mounted on the casing 10 of a fluid flow meter installed in a line for primary fluid having a high pressure conduit 11 and a low pressure conduit 12. The spindles 20 and 20a of such meters operate the control valves of the feeders. A tank 13 provides a source of additive fluid such as chemicals or the like. It is connected to the proportioning feeder by an inlet conduit 14. From the proportioning feeder an outlet conduit 15 carries the additive fluid to the low pressure conduit 12. Power for operating the proportioning feeder may be obtained from the differential drop in pressure from the high pressure conduit 11 to the low pressure conduit 12. In such instance the proportioning feeder is connected to the high pressure conduit 11 by a conduit 16 and connected to the low pressure conduit by a conduit 17. The conduits 15 and 17 may be joined prior to their connection with the low pressure conduit 12.

The construction of the fluid flow meter does not form a part of this invention. Any standard fluid motor such as is in a water meter or the like may be used. However, in these modifications the feeder is mounted on a seat 19 on the upper casing 18 of a water meter. Such seat is originally designed to hold the register for the meter. A spindle 20 projects upwardly of the seat 19 and rotates in proportion to the rate of flow of liquid through the meter. In normal use, such spindle 20 drives a register 21 (see Fig. 14) which records the volume of primary fluid flowing through the meter. In the modification of Figs. 14 to 24, inclusive, the spindle 20a is long enough to extend through the pump valve so that its outer end may also operate such register.

Figure 5:
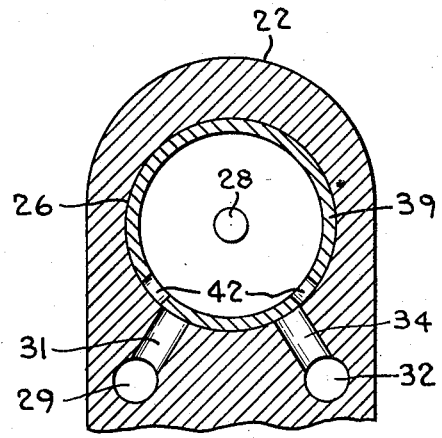
Fig. 5 is a fragmentary sectional view taken on the line 5—5 of Fig. 1.
Figure 4:
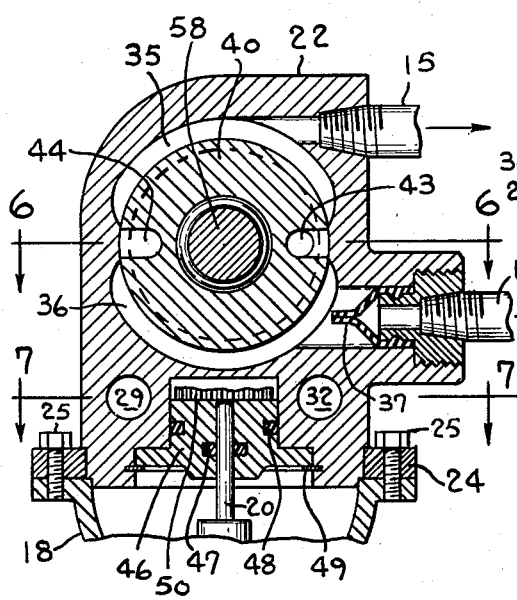
Fig. 4 is a fragmentary sectional view taken on the line 4—4 of Fig. 1.
Figure 6:
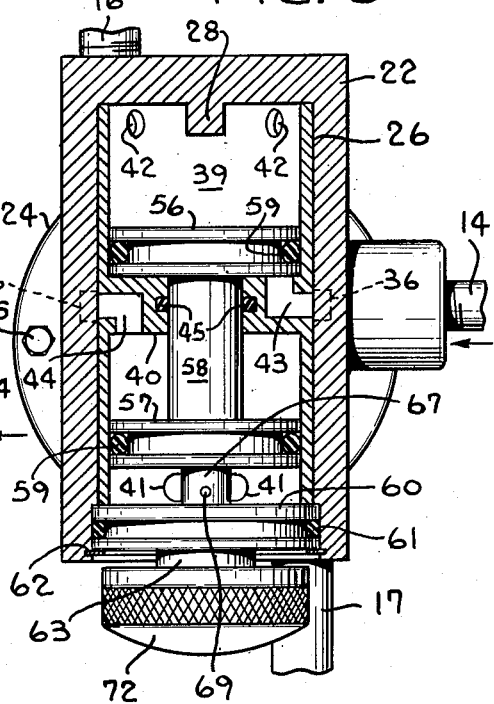
Fig. 6 is a fragmentary sectional view taken on the line 6—6 of Fig. 4.

In the modification of Figs. 1 to 13, inclusive, the proportioning feeder is contained in a housing 22 made of acrylic plastic or other material which may be molded and easily machined. Such housing has a circular projection 23 fitted in the seat 19 to properly locate the feeder in alinement with the spindle 20. A mounting flange 24 is secured to the housing and overlaps a flange on the casing 18 to which it is secured by bolts 25. The housing 22 contains a cylindrical bore 26 opening at the left end (as viewed in Fig. 1) with an enlarged diameter counterbore 27 for receiving a cylinder head. A projection 28 at the right end of such bore provides a stop for piston travel. A feature of this modification is that the bore 26 constitutes a pump valve chamber coaxial with the cylinder for the pump. It also forms the chamber for the additive fluid control valve. The high pressure conduit 16 is connected to the pump valve chamber 26 by an elongated passage 29 with a branch opening 30 entering the pump valve chamber at the left-hand end and a branch opening 31 entering such chamber at the right-hand end. The pump valve chamber 26 is connected to the low pressure conduit 17 by elongated passage 32 with a branch opening 33 entering the left-hand end of such chamber and a branch opening 34 entering the right-hand end of such chamber. Within the bore 26 are additive fluid transfer passages 35 and 36 partially encircling the pump valve chamber 26 as shown in Figs. 4 and 5. The transfer passage 35 is connected to the additive fluid conduit 15 and the transfer passage 36 is connected to additive fluid conduit 14; there being a one-way check valve 37 of the duck-bill type positioned between the conduit 14 and the transfer passage 36 to prevent back pressure into the chemical tank 13. The housing 22 has a recess 38 in which the sleeve oscillating mechanism is mounted. It will be seen that the housing thus described may be readily molded and machined.

The pump valve consists of a sleeve 39 having a central dividing wall 40. This sleeve is rotatably fitted in the pump valve chamber 26 for oscillatory movement with respect thereto. This sleeve also forms the cylinders for the pump. At the left-hand end of the sleeve 39 are a pair of ports 41 angularly spaced about 32°. At the right-hand end of such sleeve are a pair of ports 42 angularly spaced about 96°. The openings 30 and 33 and 31 and 34, previously described, are angularly spaced approximately 64°. By means later described the sleeve 39 is given oscillatory movement through an angular range of 16°. Starting from the neutral position shown in Figs. 3, 4, 5 and 8, the oscillation of the sleeve, as shown in Figs. 8 to 11, inclusive, will register ports and branch openings as shown in Figs. 12 and 13 in following sequence: (1) port 42 with branch opening 29 and port 41 with branch opening 33 with power being supplied to the right end of the pump, as shown in Fig. 13; (2) port 41 with branch opening 30 and port 42 with branch opening 34 with power being supplied to the left end of the pump, as shown in Fig. 12. The dividing wall 40 in the sleeve 39 is provided with a port 43 leading to the right-hand side of such wall and oppositely positioned port 44 leading to the left-hand side of such wall. These ports are used for the control of the additive fluid. When in the neutral position of Fig. 4, the outer ends of these ports are closed. As the sleeve is oscillated in the sequence described the ports 43 and 44 will be alined with transfer passages 35 and 36 as follows: (1) port 43 with passage 35 and port 44 with passage 36 to take additive fluid into the left side and eject additive fluid from the right side of the pump chamber as shown in Fig. 13; and (2) port 43 with passage 36 and port 44 with passage 35 to take additive fluid into the right side and eject additive fluid from the left side of the pump chamber as shown in Fig. 12. The wall 40 is bored and provided with a seal 45 for slidably receiving a piston rod as later described.

The sleeve 39 is caused to oscillate from the neutral position shown in Figs. 3 to 6, inclusive, and 8 to the position shown in Fig. 13 and back to the position shown in Fig. 12 by mechanism energized from the spindle 20. This mechanism is carried by a body 46 having a bore for spindle 20 provided with a seal 47. The body 46 seats in the recess 38 and with a seal 48 therebetween and is held in place by a spring clip 49 seated in grooves in such recess. The upper end of the shaft 20 fixedly carries a driving pinion 50 which meshes with a driven pinion 51 having its shaft carried in a bore in the body 46. The pinion 51 carries a disc 52 from the upper surface of which projects a pin 53. As the shaft 20 rotates in a counter-clockwise direction as viewed from the top of Fig. 1, the disc 52 is driven in a clockwise direction as so viewed. During the right half of its travel the pin 53 will engage a right-hand step 54 formed in the outer wall of the sleeve 39 (see Figs. 8 to 11, incl.) and during the left half of its travel will engage with a left-hand step 55 also formed in the sleeve 39. The steps 54 and 55 are spaced along the axis of the pump as shown in Fig. 1 and angularly of the sleeve rotation as shown in Figs. 8 and 10. Such angular spacing is approximately 16°. The height of the pin 53 is proportioned to the depth of the steps so that it will disengage from such steps when each has been moved 8° from the neutral position. This type of oscillating mechanism is shown for illustrative purposes. Other types may be used, provided they fit within the limited space requirements. The essential characteristic is the controlled oscillation of the sleeve 39.

The pump operable in the chamber within the sleeve 39 includes a right-hand piston 56 and a left-hand piston 57 connected by a free or floating rod 58 passing through the dividing wall 40. Each piston has a seal 59 between it and such sleeve. Because the rod 58 takes up considerable area on the inner faces of the pistons, such inner faces have less effective pressure area than the outer faces of such piston. This characteristic provides greater pressure per square inch on the additive fluid pumped by the inner faces than is imposed on the outer faces. Hence, the additive fluid can be injected into the system at a higher pressure than that derived from the system when such pressure is utilized for pumping.

The volume of additive fluid per stroke can be controlled by adjusting the length of stroke. The length of the stroke of the piston is adjusted by a variable abutment at one end. One way of making such variable abutment utilizes a head 60 with a seal 61 seated in the counter-bore 27 and held therein by a spring clip 62. The head 60 carries a rotor 63 with an internal spiral thread 64. The rotor is held in place by a mounting plate 65 seated in the head 60 and provided with a central bearing. A seal 66 is placed between the rotor and the head. An elongated variable abutment 67 provided with a longitudinal groove 68 extends out through the bearing in the plate 65 and is kept from rotating by a fixed stud 69 riding in the groove 68. The abutment 67 is secured to a disc 70 having stud 71 which rides in the thread 64. A knob 72 secured to the rotor 63 may be grasped for adjustment. When the knob 72 is turned, the pin 71 will be forced either in or out by the spiral threads 64 placing the end of the abutment 67 in the desired place to regulate the length of the stroke.

As fluid flows through the meter, the spindle 20 will rotate and the sleeve 39 will oscillate in timed relation with such flow even if variable. As explained, this will control the operation of the pump without utilizing driving power from the spindle. The rate of piston movement is thus controlled by the flow through the meter. The piston provides a positive displacement of the additive fluid, the volume of which per stroke can be regulated. Thus the additive fluid is measured accurately and continuously.

Figure 2:
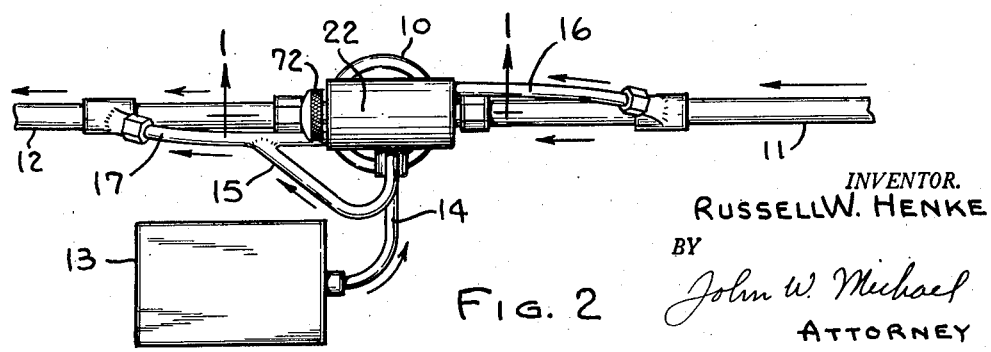
Fig. 2 is a diagrammatic top plan view of a system including such proportioning feeder.
Figure 3:
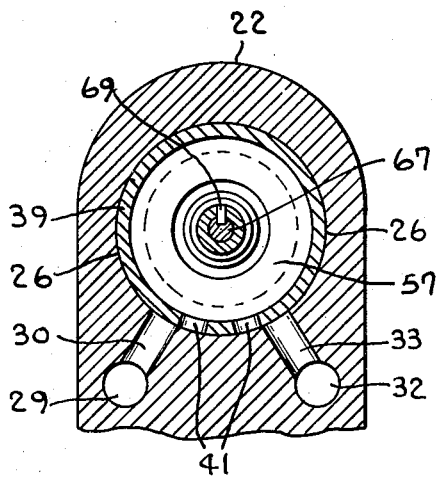
Fig. 3 is a fragmentary sectional view taken on the line 3—3 of Fig. 1.

While in Fig. 2 the proportioning feeder is shown connected to the pressure conduit 11 of the system into which the additive fluid is being injected, it may nevertheless be connected to another source of fluid under pressure higher than the pressure in the line into which the additive fluid is to be injected. When connected as shown, however, there need be some pressure drop across the meter which may be utilized to drive the pump. At low rates of flow, the pressure drop across the meter is low and in such instances it will be advisable to put a throttling device in the system to generate the needed pressure drop between the high pressure or upstream conduit 11 and the low pressure or downstream conduit 12.

Figure 16:
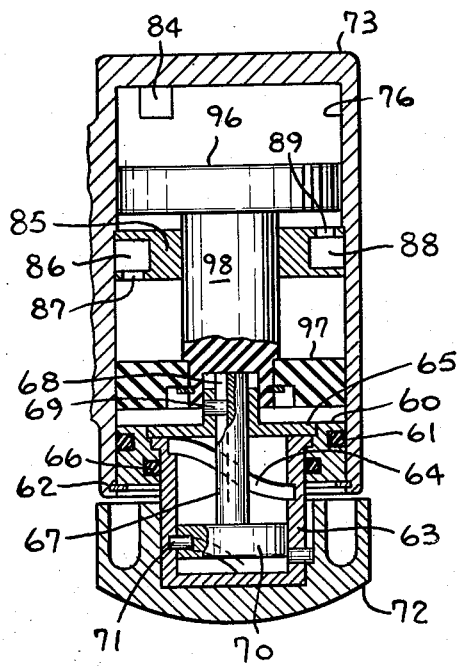
Fig. 16 is an enlarged fragmentary sectional view taken on the line 16—16 of Fig. 14.

The modification of the proportioning feeder shown in Figs. 14 to 24, inclusive, operates on substantially the same principle as that of Figs. 1 to 13, inclusive. The principal difference resides in the construction of the pump valve and the relative location of such valve with respect to the pump cylinder and additive fluid control valve chamber. This second modification, as previously pointed out, includes a register 21 which will give visible indication of the volume of fluid passing through the meter 10. In this modification the proportioning feeder includes a housing 73 which may be cast of brass. This housing includes a lower circular projection 74 which fits within the seat 19 to properly allocate the housing with respect to the meter. A pump valve chamber 75 extends upwardly from the bottom of the housing. Adjacent this is a pump cylinder 76 above which is located an additive fluid control valve chamber 77. The housing 73 has a recess 78 which provides a seat for the register 21 and accommodates the gear train as hereinafter described. A high pressure passage 79 leads from the conduit 16 to the chamber 75 and a low pressure passage 80 leads from such chamber to the conduit 17. The chamber 75 is provided with an encircling passageway 81 (see Fig. 20) leading to a port 82 at the front end of the cylinder 76 and another encircling passageway 83 (see Fig. 19) leading to a port 84 in the rear end of the cylinder 76. A dividing wall or partition 85 is seated as shown in Fig. 16 within the cylinder 76 and has a central bore to accommodate a piston rod. The wall 85 has a passage 86 leading from a port 87, opening to the front part of the cylinder, to the left end of the additive fluid valve chamber 77. A like passageway 88 in such wall leads from a port 89, opening to the rear part of the cylinder, to the right-hand end of the chamber 77.

A pump valve 90 is fixedly mounted on a spindle 20a to rotate therewith within the chamber 75. The lower end of such chamber is sealed by a head 91 held by a snap ring or other means. The head 91 has a port 92 continuously connected with the high pressure passage 79 and a port 93 continuously connected to the low pressure passageway 80. These ports open to the upper side of the head 91 so as to be alternately in registration with passages 94 and 95 in the rotary valve 90. The upper end of passage 94 is continuously in engagement with the encircling passage 81 and the upper end of passage 95 is continuously in engagement with the encircling passage 83. Hence the rotation of the valve 90 alternately connects the high pressure passage 79 with the front and rear of the pump cylinder 76 and the low pressure passage 80 with the rear and front of the pump cylinder 76 as is diagrammatically shown in Figs. 21 to 24, inclusive.

The pump consists of a rear piston 96 and a front piston 97 interconnected by a free sliding rod 98. These pistons freely float within the cylinder 76, one on each side of the dividing wall 85. As heretofore described in connection with the first modification, these free floating pistons provide larger areas on the outer faces than on the inner faces, hence providing a pressure increase for the injection of the additive fluid. In the schematic showing of Fig. 21 the pistons have just completed their stroke from the rear toward the front and the valve 90 is about to disconnect the pressure line 79 from the passageway 83 and the low pressure line 80 from the passageway 81. In Fig. 22 the valve 90 has rotated sufficiently to bring the pressure line 79 into connection with the passage 81 and the low pressure passage 80 into connection with the passage 83. The piston is then in motion toward the rear end of the cylinder. In Fig. 23 this motion has been completed and the valve 90 is about to disconnect the pressure line 79 from the passage 81 and the low pressure line 80 from the passage 83. In Fig. 24 the valve 90 has rotated sufficiently to connect the high pressure passage 79 with the passage 83 and the low pressure passage 80 with the passage 81 so that the piston is moving to the front. As the piston moves back and forth under this control, it will pick up additive fluid from a source of fluid pressure through the incoming line 14 and eject it out the conduit 15.

Figure 14:
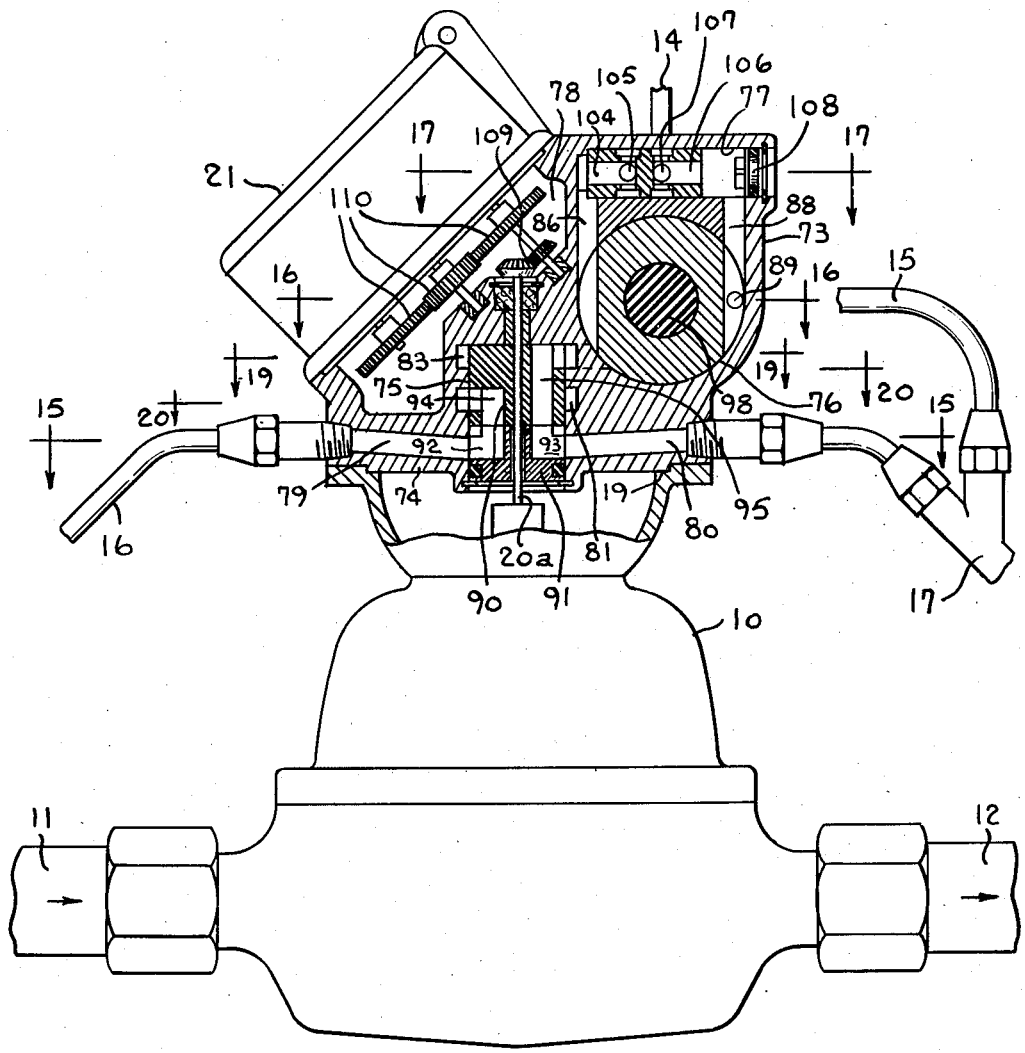
Fig. 14 is a view partly in side elevation and partly in section of a second modification of a proportioning feeder embodying the present invention.
Figure 15:
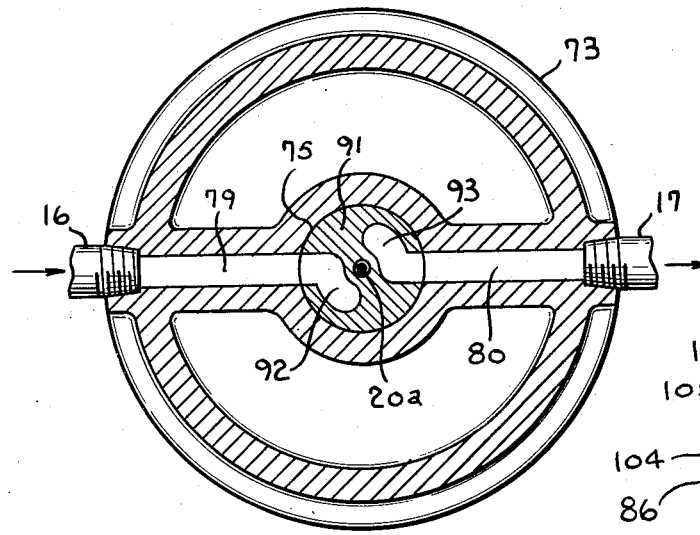
Fig. 15 is an enlarged fragmentary sectional view taken on the line 15—15 of Fig. 14.
Figure 17:
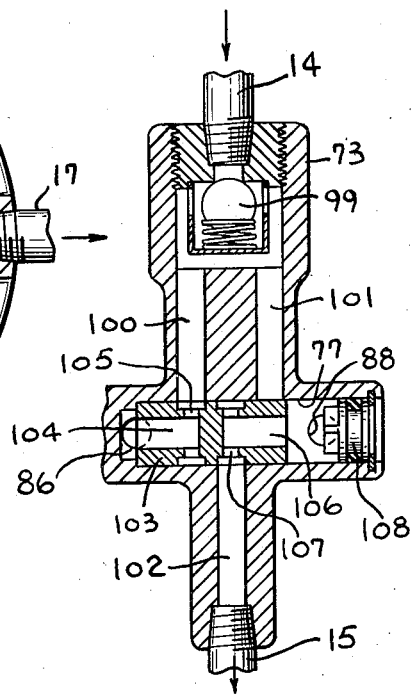
Fig. 17 is an enlarged fragmentary sectional view taken on the line 17—17 of Fig. 14.
Figure 18:
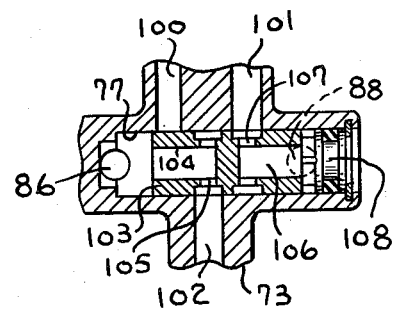
Fig. 18 is a view similar to Fig. 7 with the additive fuel control valve in the right-hand position.

In the figures just described, the additive fluid control valve is shown schematically to indicate how the intake line 14 and ejection line 15 are alternately connected to the inner faces of the pistons 96 and 97. In Figs. 14, 17 and 18 the construction of one form of additive fluid control valve is shown. It includes a check valve 99 positioned at the entrance of the conduit 14. Leading from the check valve are a pair of spaced passages 100 and 101. Passage 100 is connected to the left-hand end of the chamber 77 and passage 101 to the right-hand side of such chamber. The central part of the chamber 77 is connected by a passage 102 to the injection conduit 15. A plunger 103 freely reciprocates in the chamber 77, forced from end to end by the pressure alternatively transmitted to it through the passageways 86 and 88. This plunger has a central passageway 104 terminating in ports 105 to the left of center and a central passage 106 terminating in ports 107 to the right of center. The plunger is held within the chamber 77 by a head 108 sealed in the open end of such chamber by a C-ring or the like. In the position shown in Fig. 17, pressure from passage 88 has forced the plunger to the left of the chamber 77 and the additive fluid is entering passage 86 to the rear of piston 97 and being ejected by piston 96 through the passage 88. In Fig. 18, pressure from passage 86 has forced the plunger to the right end of chamber 77 and the additive fluid is entering passage 88 to the rear of piston 96 and is being ejected by the piston 97 through the passage 86.

In this modification the spindle 20a extends into the recess 78 above the valve 90 and has on its upper end one of a pair of bevel gears 109. These gears are connected by a gear train indicated generally at 110 which drive the register 21 in the usual manner.

I claim:

1. A proportioning feeder comprising a primary fluid conduit, a flow responsive device in said conduit, a casing for said device having a seat for a meter register or the like, a spindle operated by said device projecting beyond said seat, a housing having a mounting secured to said seat, a pump valve chamber in said housing, a pump cylinder in said housing having a ported dividing wall, an additive fluid control valve chamber in said housing, first passageways within said housing leading from said pump valve chamber to said pump cylinder, second passageways within said housing leading from said pump cylinder to said additive fluid control valve chamber, a pump valve in said pump valve chamber operatively connected to said spindle, pistons freely floating in said pump cylinder on opposite sides of said wall, said pistons being interconnected by a rod passing through said wall, a multiport valve operatively associated with said additive fluid control chamber, a conduit connecting a source of fluid pressure to said pump valve chamber, a conduit connecting said additive fluid control valve chamber to a source of additive fluid, and a conduit connecting said additive fluid control valve chamber to said primary fluid conduit.

2. A proportioning feeder comprising a primary fluid conduit, a flow responsive device in said conduit, a casing for said device having a seat for a meter register or the like, a spindle operated by said device projecting beyond said seat, a housing having a mounting secured to said seat, a pump valve chamber in said housing, a pump cylinder in said housing having a ported dividing wall, an additive fluid control valve chamber in said housing, first passageways within said housing leading from said pump valve chamber to said pump cylinder, second passageways within said housing leading from said pump cylinder to said additive fluid control valve chamber, a pump valve in said pump valve chamber operatively connected to said spindle, pistons freely floating in said pump cylinder on opposite sides of said wall, said pistons being interconnected by a rod passing through said wall, a multiport valve operatively associated with said additive fluid control chamber and operated by said pump valve, a conduit connecting a source of fluid pressure to said pump valve chamber, a conduit connecting said additive fluid control valve chamber to a source of additive fluid, and a conduit connecting said additive fluid control valve chamber to said primary fluid conduit.

3. A proportioning feeder comprising a primary fluid conduit, a flow responsive device in said conduit, a casing for said device having a seat for a meter register or the like, a spindle operated by said device projecting beyond said seat, a housing having a mounting secured to said seat, a pump valve chamber in said housing, a pump cylinder in said housing having a ported dividing wall, an additive fluid control valve chamber in said housing, first passageways within said housing leading from said pump valve chamber to said pump cylinder, second passageways within said housing leading from said pump cylinder to said additive fluid control valve chamber, a pump valve in said pump valve chamber operatively connected to said spindle, pistons freely floating in said pump cylinder on opposite sides of said wall, said pistons being interconnected by a rod passing through said wall, a multiport valve operatively associated with said additive fluid control chamber and controlled by said piston, a conduit connecting a source of fluid pressure to said pump valve chamber, a conduit connecting said additive fluid control valve chamber to a source of additive fluid, and a conduit connecting said additive fluid control valve chamber to said primary fluid conduit.

4. A proportioning feeder comprising a primary fluid conduit, a flow responsive device in said conduit, a spindle operated by said device, a housing, a pump valve chamber in said housing, a pump cylinder in said housing, an additive fluid control valve chamber in said housing, first passageways within said housing leading from said valve chamber to said pump cylinder, second passageways within said housing leading from said pump cylinder to said additive fluid control valve chamber, a pump valve in said pump valve chamber operatively connected to said spindle, a piston freely floating in said pump cylinder, a multiport valve operatively associated with said additive fluid control chamber, a conduit connecting a source of fluid pressure to said pump valve chamber, a conduit connecting said additive fluid control valve chamber to a source of additive fluid, and a conduit connecting said additive fluid control valve chamber to said primary fluid conduit.

5. In proportioning device for liquids a pump controlled by the rate of flow of primary fluid comprising a cylinder having a ported dividing wall, axially aligned pistons in said cylinder on opposite sides of said wall, a rod interconnecting said pistons and slidably mounted in a stuffing box in said wall, said pistons being free floating with the effective area of outer faces thereof being greater than the effective area of inner faces thereof, means connecting said outer faces with a source of fluid power and means including said ported dividing wall for connecting said inner faces with a source of additive fluid.

6. A proportioner for introducing additive fluid to primary fluid comprising a primary fluid conduit, a flow responsive device in said conduit, a pump body having a cylindrical chamber, angularly spaced power fluid passage openings in said body connected to a source of fluid pressure, angularly spaced additive fluid passage openings spaced from said power fluid passage openings and connected to a source of additive fluid, a sleeve rotatably carried within said chamber, said sleeve having angularly spaced power fluid ports registrable with said power fluid passage openings and angularly spaced additive fluid ports registrable with said additive fluid passage openings, said sleeve constituting a cylinder, a piston in said cylinder operable between said power fluid passage openings and said additive fluid passage openings upon registration and non-registration of said openings and ports, and means operated by said flow responsive device for oscillatingly rotating said sleeve to control registration and non-registration of said ports and said passage openings.

7. A proportioner as claimed in claim 6 in which said means consists of a member having unidirectional angular travel and said sleeve has angularly opposite spaced steps alternatively engaged by said member.

8. A proportioner as claimed in claim 7 in which said power fluid passage openings and said power fluid ports are differently angularly spaced an amount equal to the angular spacing of said spaced steps.

9. A proportioner as claimed in claim 8 in which said additive fluid passage openings are angularly separated an amount equal to the angular spacing of said spaced steps.

10. A proportioner comprising a flow responsive device having a casing with a projecting spindle, a pump body having a bore, a cylindrical rocker value in said bore, a free floating piston in said valve movable along the axis of rotation of said valve, means operating by said spindle to oscillate said valve, and openings in said valve and said bore registering or non-registering during oscillation of said valve to control said piston.

References Cited in the file of this patent

UNITED STATES PATENTS

| | | |
|---|---|---|
| 1,999,881 | Lowe | Apr. 30, 1935 |
| 2,174,784 | Formhals | Oct. 3, 1939 |
| 2,218,393 | Croydon | Oct. 15, 1940 |
| 2,238,747 | Ornstein | Apr. 15, 1941 |
| 2,679,208 | Euverard | May 25, 1954 |